United States Patent [19]

Stücheli

[11] 4,332,499

[45] Jun. 1, 1982

[54] JOINT

[76] Inventor: Edwin Stücheli, In den Reben 379, CH-5105 Auenstein, Switzerland

[21] Appl. No.: 186,247

[22] Filed: Sep. 11, 1980

[30] Foreign Application Priority Data

Sep. 11, 1979 [CH] Switzerland .................. 8188/79

[51] Int. Cl.³ .................. F16B 7/10; F16C 11/00; F16D 1/12
[52] U.S. Cl. .................. 403/53; 248/289.1; 269/70; 403/96; 403/116
[58] Field of Search .................. 403/53, 96, 116; 108/139; 312/11, 125, 252; 248/289.1, 291; 269/70, 71

[56] References Cited

U.S. PATENT DOCUMENTS

| | | | |
|---|---|---|---|
| 2,104,524 | 1/1938 | Porter | 403/53 X |
| 2,388,320 | 11/1945 | Gardiner | 269/70 |
| 2,571,443 | 10/1951 | Hair | 403/53 X |
| 2,704,951 | 3/1955 | Petersen | 269/70 X |
| 2,717,141 | 9/1955 | Livingston | 403/53 X |
| 2,922,669 | 1/1960 | Hansen | 403/96 |
| 4,229,060 | 10/1980 | Brownlee et al. | 312/125 X |

Primary Examiner—Wayne L. Shedd
Attorney, Agent, or Firm—Thomas W. Speckman

[57] ABSTRACT

The joint of this invention is pivotable and lockable about two perpendicularly intersecting axes. It is particularly suitable for a reading stand for patients confined to bed. By means of the joint, the supporting surface of the reading stand can be adjusted as to slant as well as transverse tilt. The joint comprises a T-shaped component (12) supported in bearings (11) so as to be tiltable and lockable about its cross beam. The bearings (11) are mounted on a base plate (10). The base plate (10) itself is pivotable and lockably secured to a support plate (20). In order for a sick person to be able to adjust the joint with a minimum of physical exertion, locking levers (14 and 23) are provided for each of the two adjustable positions. The locking is effected by detent means (13—13' and 17–26).

6 Claims, 5 Drawing Figures

JOINT

BACKGROUND OF THE INVENTION

The present invention relates to a joint structure comprising a base plate having two bearings secured thereon for supporting a T-shaped component of the joint so as to render it tiltable and lockable in different positions. A joint of this type is known from Swiss Patent Specification CH-PS No. 430 100. It is particularly suitable for adjusting the transverse tilting position of the supporting surface or the table top of a reading stand or a bed table. The supporting surface may be made of a transparent plastic material so that a book or the like placed thereon can be read through the transparent plate.

This is of particular advantage to immobilized patients. For a paralyzed or otherwise immobilized patient, lying on one side, who is not able or is not permitted to move, it is highly desirable to have the supporting surface tilt not only vertically to his viewing direction, but also have it adjustable in a transverse direction. To enable the patient lying in the afore-mentioned position to read in a normal fashion, the lines of the reading material should run approximately parallel to the imaginary connecting line between his eyes.

SUMMARY OF THE INVENTION

It is the object of the present invention to provide a joint for use in connection with the aforementioned purpose, which joint permits the supporting surface of a reading stand to be adjustable to different positions as to its inclination as well as its transverse tilt, and to hold it in such positions. Since furthermore, it should be possible to make an adjustment with ease, without requiring any great amount of physical strength, the locking of the supporting surface into the adjusted position by means of a clamping screw is out of the question.

The joint of this invention is pivotable and lockable about two perpendicularly intersecting axes. It is particularly suitable for a reading stand for patients confined to bed. By means of the joint, the supporting surface of the reading stand can be adjusted as to slant as well as transverse tilt. The joint comprises a T-shaped component (12) supported in bearings (11) so as to be tiltable and lockable about its cross beam. The bearings (11) are mounted on a base plate (10). The base plate (10) itself is pivotable and lockably secured to a support plate (20). In order for a sick person to be able to adjust the joint with a minimum of physical exertion, locking levers (14 and 23) are provided for each of the two adjustable positions. The locking is effected by detent means (13—13' and 17-26).

BRIEF DESCRIPTION OF THE DRAWINGS

The drawings illustrate preferred embodiments of the present invention and its use wherein.

DESCRIPTION OF PREFERRED EMBODIMENTS

Figure 2:
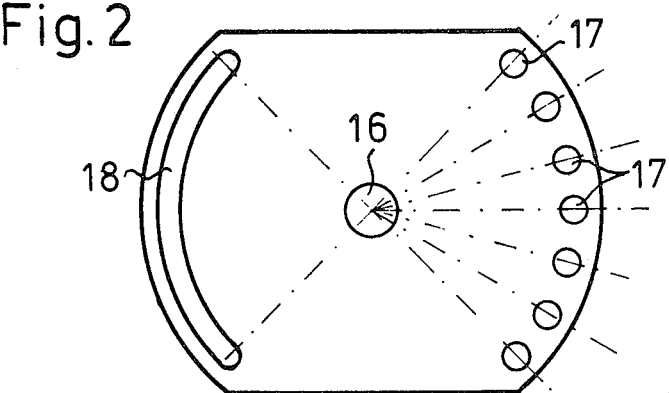
FIG. 2 is a bottom view of the base plate of the joint shown in FIG. 1.
Figure 1:
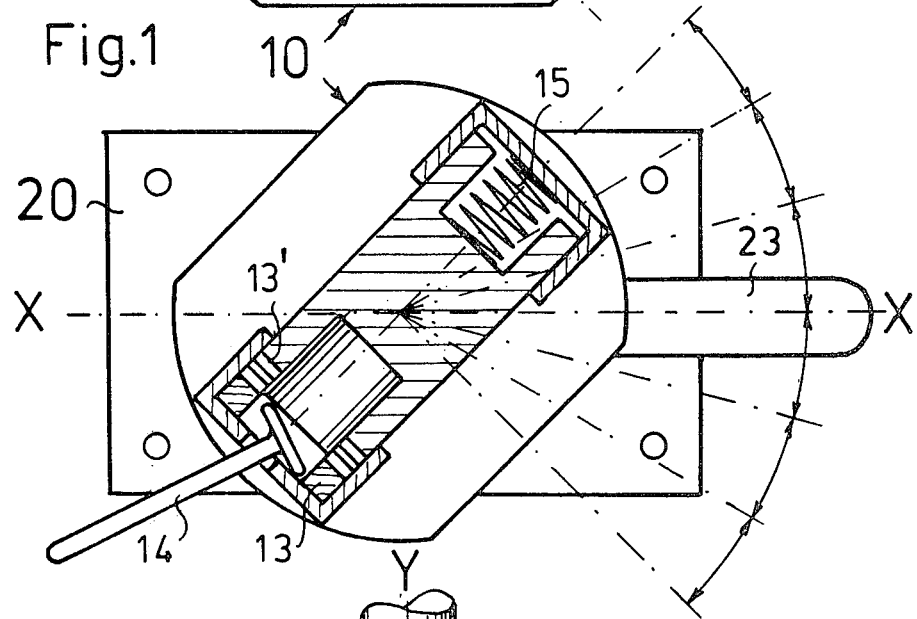
FIG. 1 is a top view, partially in section, of a joint according to the invention.
Figure 3:
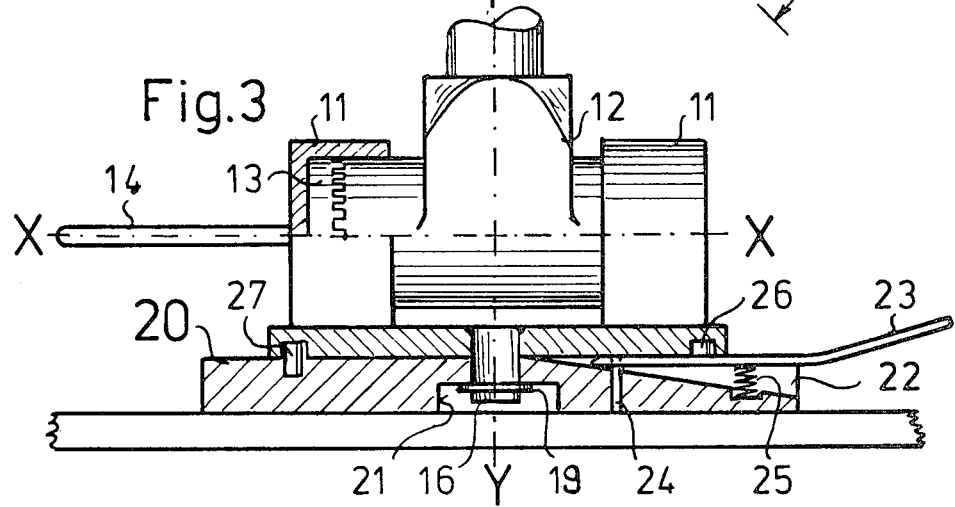
FIG. 3 is a side view, partially in section, of the joint shown in FIGS. 1 and 2.

The joint illustrated in FIGS. 1-3 is swingable and lockable about two perpendicular axes x—x and y—y. The part which is swingable about the axis x—x is known from Swiss Patent Specification CH-PS No. 430 100 and will therefore only be briefly described in the following. Mounted on a base plate 10 are two bearings 11 to support a T-shaped joint component 12 in such a manner that it is tiltable and lockable in different positions. To effect a locking of the joint component 12, a gear ring 13 is provided on the left hand bearing to correspond with a toothed section 13' on the side of the cross beam of the T-shaped part 12 (see FIGS. 1 and 3). In the locked position, the two toothed structures are in meshing engagement, as is shown in FIG. 3.

The meshing engagement of the parts 13 and 13' can easily be unlocked by the mushroom-shaped lever 14, against the action of the spring 15, so that the joint is free to be tilted.

Centrally disposed on the underside of the base plate 10 of the joint structure is a pin 16 whose median axis y—y perpendicularly intersects the pivot axis x—x. By means of this pin 16, the base plate 10 is maintained on a support or fastening plate 20 so as to be pivotable about the axis y—y. The support or fastening plate 20 is provided with a recess 21 for receiving the pin 16 therein which is secured by retaining clip 19.

The support plate 20 is provided with a groove 22 which tapers off in the direction of the pin 16, for receiving a flat actuating lever 23. The lever 23 is secured in the shallow section of the groove 22, toward the end thereof, by a pin 24 to protect the lever 23 from falling out. The bore in the lever 23 for receiving the pin 24 is slightly wider than, i.e. has a greater diameter, than the pin so that the lever 23 can be moved up and down in the groove 22. Disposed under the lever 23 is a coil spring 25 to urge the lever upwardly. The top surface of the lever 23 is provided with a detent cam 26.

To lock the base plate 10 on the support plate 20 in a given pivotal position, a series of recesses 17 (see FIG. 1) are provided in the underside of the base plate 10 to facilitate a locking in different positions, which in this embodiment are spaced apart by 15°.

To prevent the base plate 10 from being pivoted beyond the extreme locking positions, the underside of the base plate 10 is further provided with a groove 18 in concentric relationship to the pin 16. A pin 27 provided on the support plate 20 and projecting into the groove 18 serves as a stop or detent means.

Figure 4:
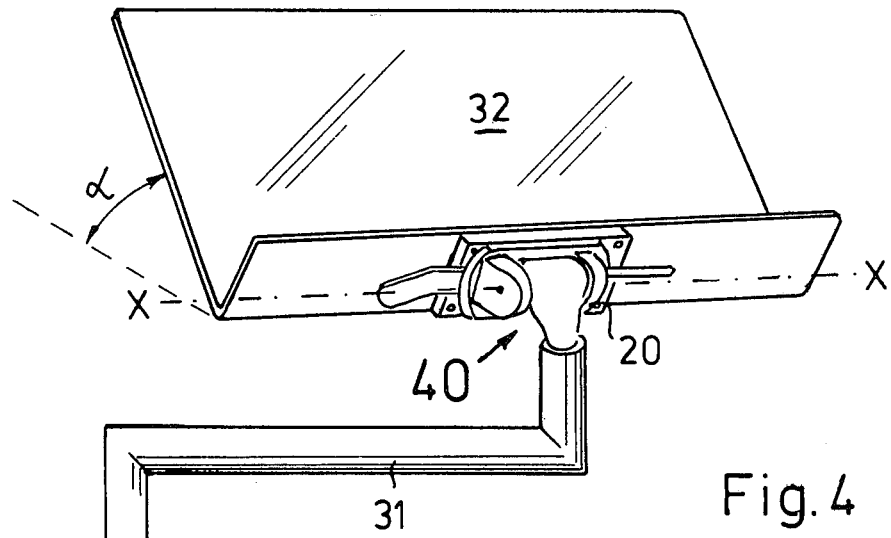
FIGS. 4 and 5 are perspective views of the joint fastened to a transparent supporting plate.
Figure 5:
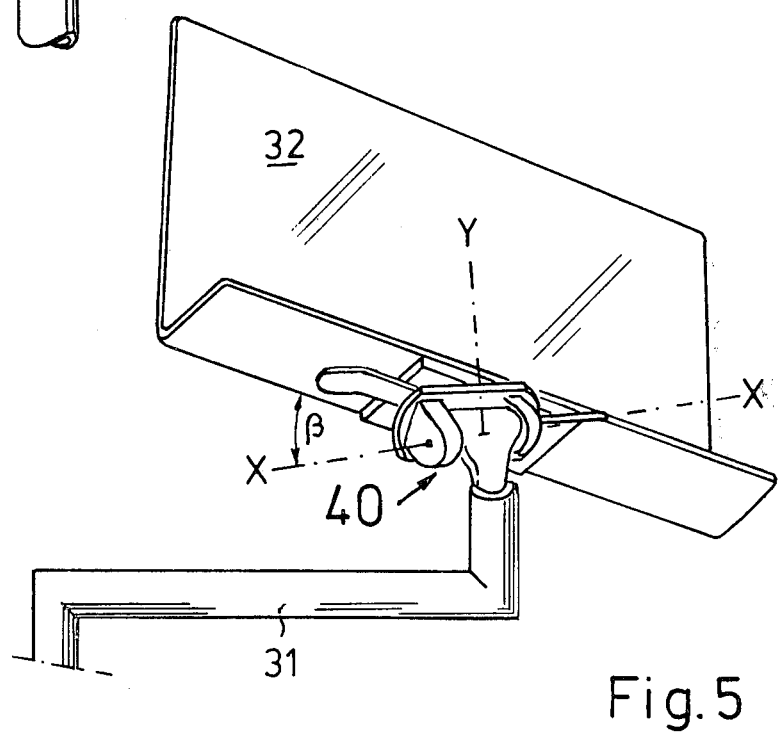

FIGS. 4 and 5 illustrate the use of the joint described in the foregoing in conjunction with a reading stand. The stand 30 is provided with an arm 3 which is adjustable in height and on which is mounted the joint structure designated as a unit 40. Secured to the support plate 20 is a transparent supporting surface 32 made of acrylic transparent plastic. As shown in FIG. 4, the supporting surface 32 has been tilted about the pivot axis x—x in the upward direction by an angle α from the horizontal.

In FIG. 5, the supporting surface 32 has additionally been tilted about the pin 16 on the axis y—y by an angle β, so that a bedridden patient lying on his side is able to read a book or the like placed on the supporting surface through the transparent surface.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A joint comprising a base plate having two bearings secured thereto for supporting a T-shaped joint component so as to render it tiltable about its cross beam and lockable in different positions, characterized in that said base plate (10) is maintained on a support plate (20) in a pivotable condition by means of a pin (16), the median line (y—y) of said pin (16) perpendicularly intersecting the pivot axis (x—x) of said cross beam, said base plate (10) being lockable in different positions.

2. A joint according to claim 1, characterized in that said base plate (10) is provided on its underside with a series of recesses (17) arranged in concentric relationship to said pin (16), and that said support plate is provided with a groove (22) tapering in the direction of the pin (16) for receiving a flat, spring biased, laterally projecting locking lever (23) which is movable at right angles to the plane of the support plate.

3. A joint according to claim 1, characterized in that said base plate (10) is provided on its underside with a groove (18) in concentric relationship to said pin (16), and in that the support plate (20) is provided with a detent cam (27) adapted to firmly engage the groove and limit the pivot angle.

4. A joint according to claim 2, characterized in that said locking lever (23) is provided with a detent cam (26) to engage a recess (17) to lock rotation of said base plate (10) about said pin (16).

5. A joint according to claim 2, characterized in that said base plate (10) is provided on its underside with a groove (18) in concentric relationship to said pin (16), and in that the support plate (20) is provided with a detent cam (27) adapted to firmly engage the groove and limit the pivot angle.

6. A joint according to claim 3, characterized in that said locking lever (23) is provided with a detent cam (26) to engage a recess (17) to lock rotation of said base plate (10) about said pin (16).

* * * * *